(12) United States Patent
Nishigata et al.

(10) Patent No.: US 6,910,629 B2
(45) Date of Patent: Jun. 28, 2005

(54) INFORMATION REPRODUCTION APPARATUS

(75) Inventors: Junko Nishigata, Kawagoe (JP); Akihiro Denda, Kawagoe (JP); Yoshiya Nonaka, Kawagoe (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 10/158,135

(22) Filed: May 31, 2002

(65) Prior Publication Data

US 2002/0179706 A1 Dec. 5, 2002

(30) Foreign Application Priority Data

May 31, 2001 (JP) ..................................... P2001-164866

(51) Int. Cl.⁷ ................................................ G06K 7/06
(52) U.S. Cl. ...................... 235/441; 235/492; 235/380; 235/439
(58) Field of Search ................................ 235/492–493, 235/486–487, 375, 449, 439–441, 380, 444, 44; 710/8, 10, 15, 19, 62, 65

(56) References Cited

U.S. PATENT DOCUMENTS

| | | | | |
|---|---|---|---|---|
| 4,727,244 A | * | 2/1988 | Nakano et al. ............. | 235/380 |
| 4,810,863 A | * | 3/1989 | Kachi et al. ................ | 235/441 |
| 5,045,674 A | | 9/1991 | Mita et al. .................. | 235/439 |
| 5,192,858 A | * | 3/1993 | Sakurada .................... | 235/475 |
| 5,317,138 A | * | 5/1994 | Togawa ...................... | 235/440 |
| 5,332,890 A | * | 7/1994 | Kitahara .................... | 235/440 |
| 5,589,719 A | * | 12/1996 | Fiset .......................... | 307/131 |
| 5,703,346 A | * | 12/1997 | Bricaud et al. ............. | 235/441 |
| 5,802,328 A | | 9/1998 | Yoshimura | |
| 5,912,618 A | | 6/1999 | Maugars ...................... | 340/520 |
| 5,969,329 A | | 10/1999 | Vallat ......................... | 235/475 |
| 6,041,375 A | * | 3/2000 | Bass et al. .................. | 710/302 |
| 6,059,592 A | | 5/2000 | Inadama ...................... | 439/188 |
| 6,149,064 A | * | 11/2000 | Yamaoka et al. ........... | 235/479 |
| 6,168,077 B1 | * | 1/2001 | Gray et al. ................. | 235/375 |
| 6,206,293 B1 | * | 3/2001 | Gutman et al. ............. | 235/493 |
| 6,439,464 B1 | * | 8/2002 | Fruhauf et al. ............. | 235/492 |
| 6,454,164 B1 | * | 9/2002 | Wakabayashi et al. ...... | 235/380 |
| 6,457,647 B1 | * | 10/2002 | Kurihashi et al. .......... | 235/486 |
| 6,480,457 B1 | * | 11/2002 | Onodera et al. ........ | 369/178.01 |
| 6,609,295 B1 | * | 8/2003 | Koyama et al. .............. | 29/832 |
| 6,662,119 B1 | * | 12/2003 | Mitchell ...................... | 702/34 |
| 6,665,744 B2 | * | 12/2003 | Shimamoto .................. | 710/15 |
| 6,705,524 B2 | * | 3/2004 | Chow et al. ................ | 235/441 |
| 6,813,668 B2 | * | 11/2004 | Tseng et al. ................ | 710/301 |

FOREIGN PATENT DOCUMENTS

| | | |
|---|---|---|
| DE | 196 29 758 A1 | 10/1997 |
| DE | 197 08 700 A1 | 8/1998 |
| EP | 0 595 305 A1 | 5/1994 |
| EP | 0 889 493 A2 | 1/1999 |
| JP | 2-300882 | 12/1990 |

OTHER PUBLICATIONS

Chinese Office Action.

* cited by examiner

*Primary Examiner*—Thien M. Le
*Assistant Examiner*—Edwyn Labaze
(74) *Attorney, Agent, or Firm*—Nixon & Vanderhye, PC

(57) ABSTRACT

The information reproduction apparatus for reproducing information recorded on a card-type recording medium is configured so as to include an attachment/reproduction device which the card-type recording medium is inserted in and attached to for reproducing the information recorded on the card-type recording medium; a connection detection device for detecting a state whether or not the card-type recording medium is electrically connected to the attachment/reproduction device; an insertion detection device for detecting a state whether or not the card-type recording medium is inserted into the attachment/reproduction device; and a control device for determining the attachment state of the card-type recording medium based on the state detected by the connection detection device and the state detected by the insertion detection device.

20 Claims, 13 Drawing Sheets

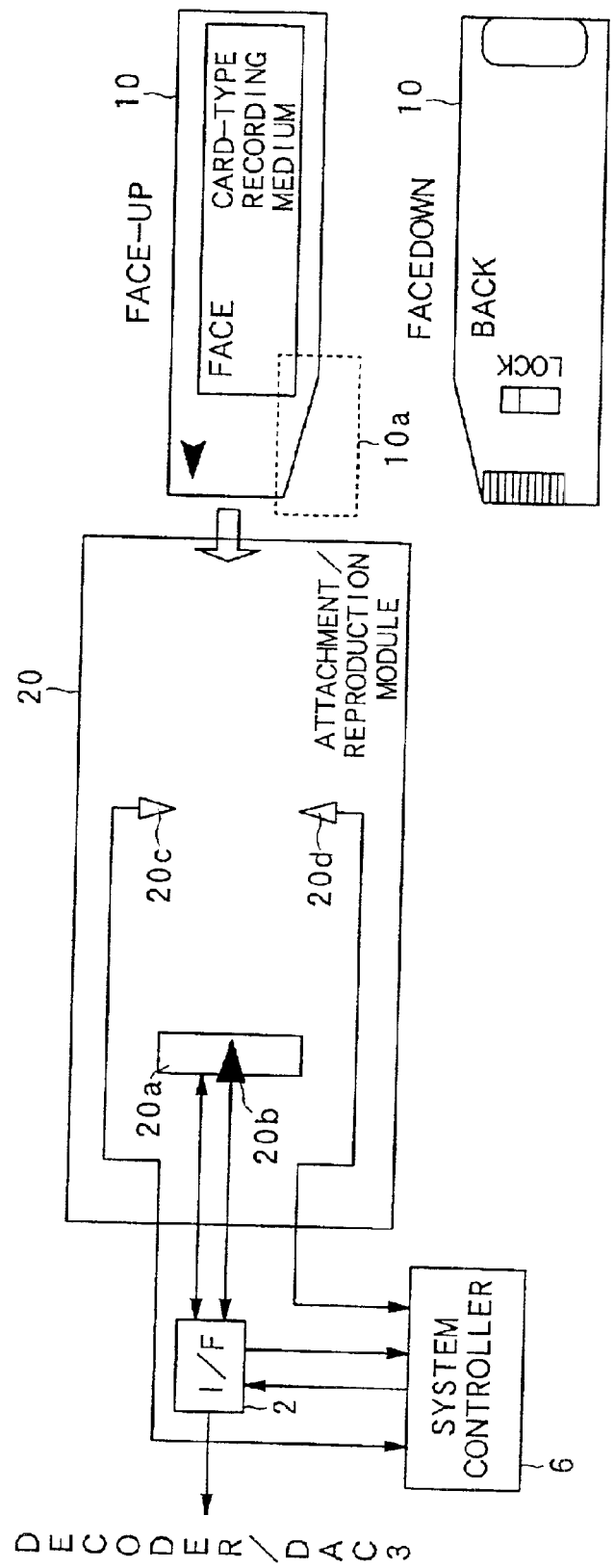

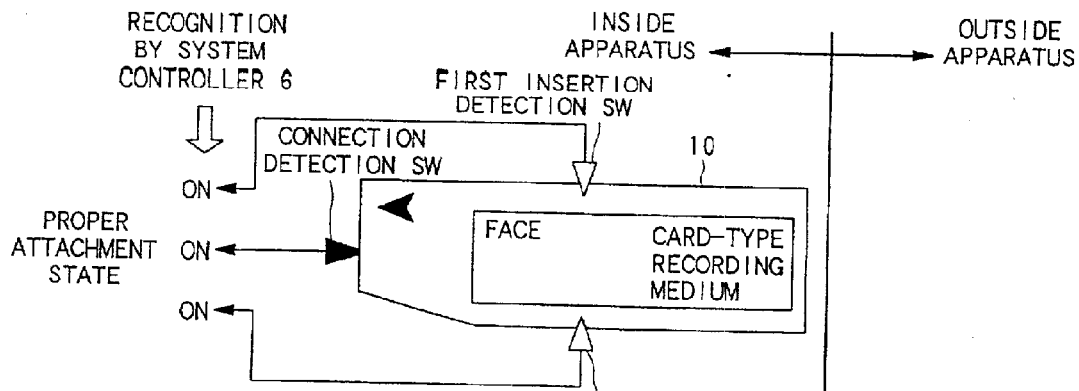
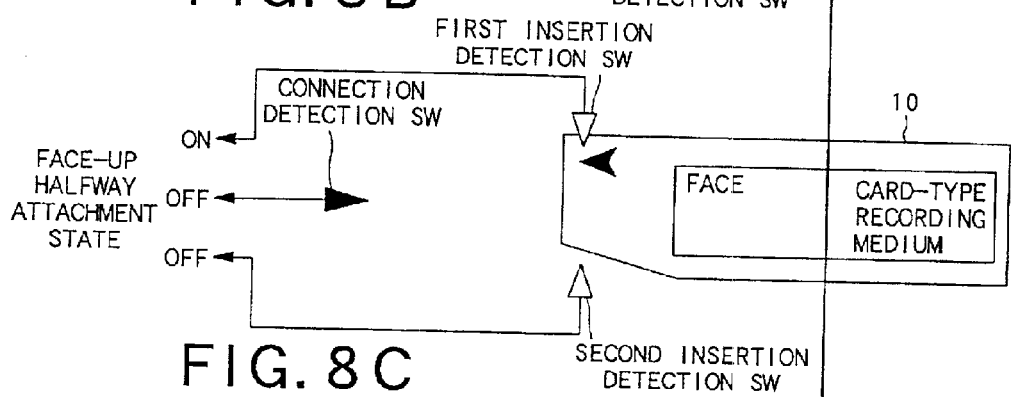
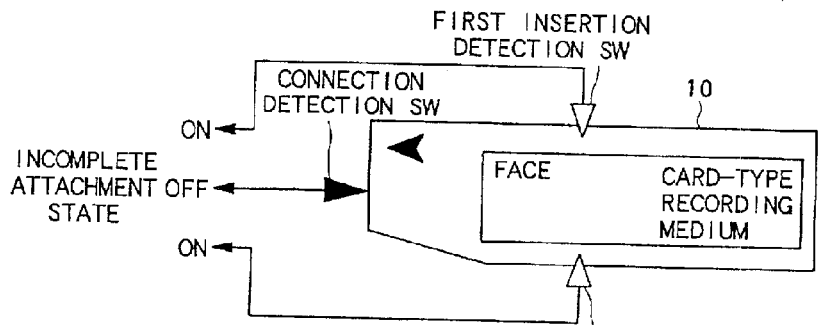
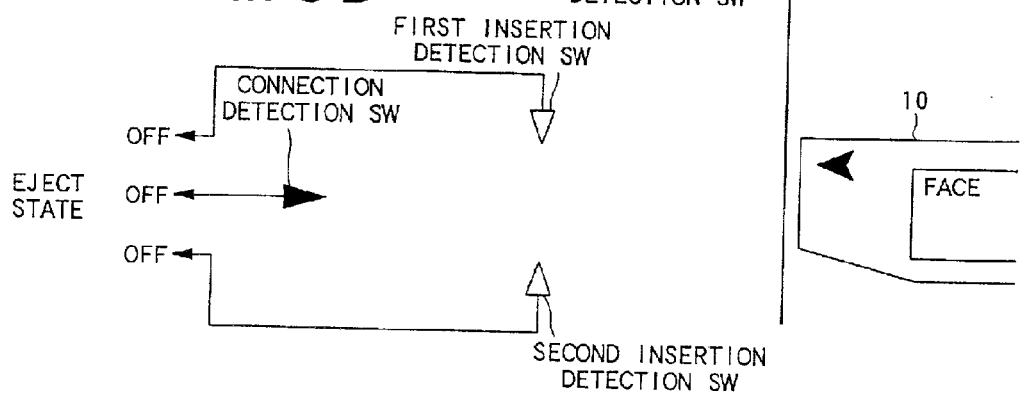

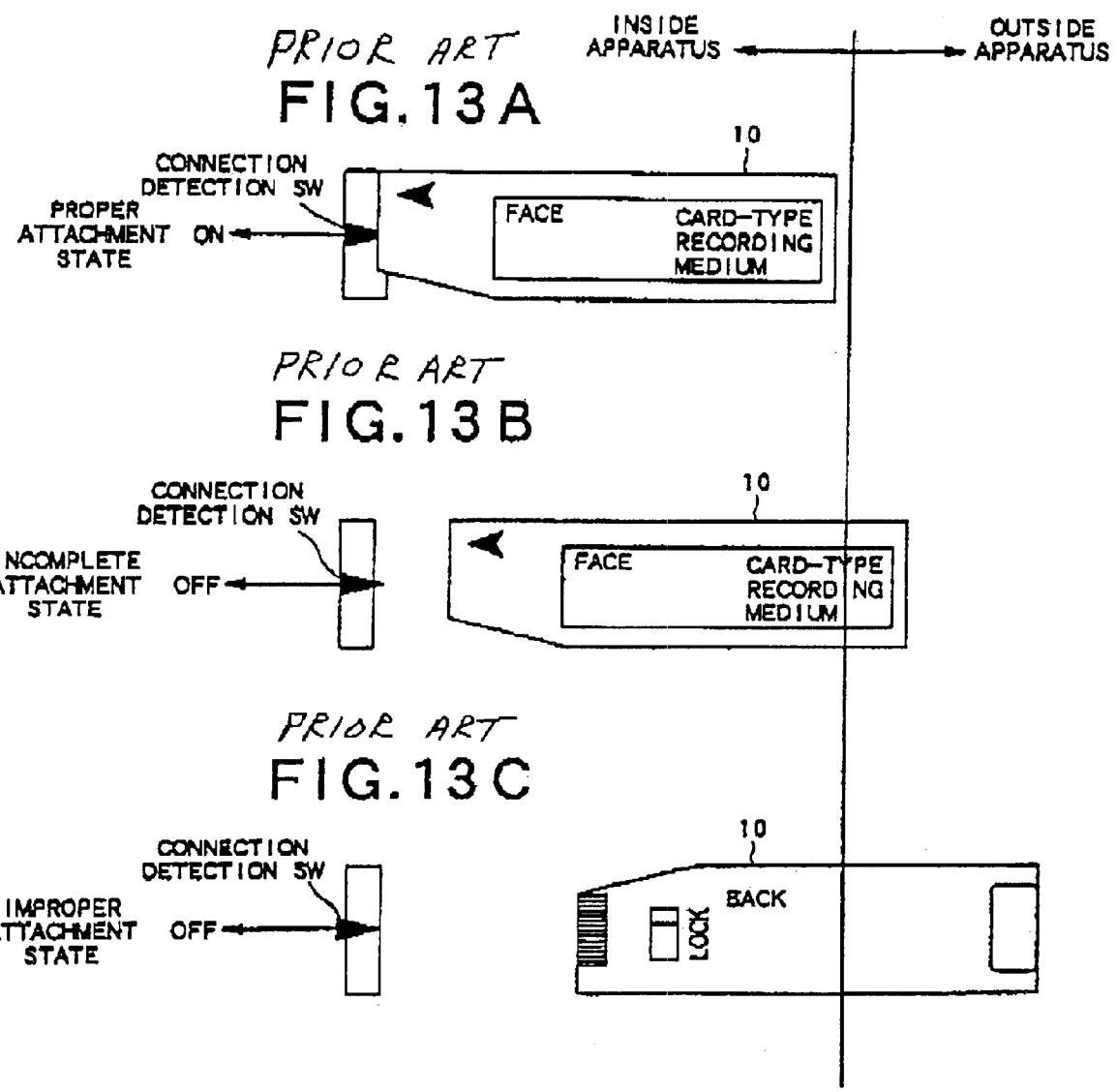

INFORMATION REPRODUCTION APPARATUS

BACKGROUND OF THE INVENTION

1. Field of the Invention

The present invention relates to a mechanism for detecting an improper attachment of a card-type recording medium in an apparatus for reproducing information recorded on the card-type recording medium.

2. Description of the Related Art

In recent years, information reproduction apparatuses, such as an on-vehicle audio apparatus, for reproducing information such as music, in which a card-type recording medium can be used have become widespread.

In the information reproduction apparatus mentioned above, when a card-type recording medium is inserted into an attachment module in the apparatus to be attached to a card-type-recording-medium connector as shown in FIG. 13A, a correct attachment is detected in response to an electric short circuit between some terminals of the connector. When the attachment is detected, the card-type recording medium can be turned on as a source.

However, if the card-type recording medium is improperly attached to the connecter and is not electrically connected to the connector in the information reproduction apparatus as shown in FIG. 13B, or the card-type recording medium is inserted upside down as shown in FIG. 13C, for example, the apparatus cannot recognize the improper attachment and determines that the card-type recording medium is not inserted into the apparatus, and therefore cannot use the medium as a source. Such an improper attachment may often occur primarily because the correct orientation or direction of the card-type recording medium cannot be identified by a user because of its considerably small size compared with conventional media such as CDs.

In such a case, no indication is presented to the user, therefore the user may mistake it for a failure in the apparatus itself.

SUMMARY OF THE INVENTION

It is therefore an object of the present invention to provide an information reproduction apparatus that informs a user of an improper attachment of a card-type recording medium.

The above object of the present invention can be achieved by an information reproduction apparatus for reproducing information recorded on a card-type recording medium, provided with; an attachment/reproduction device which the card-type recording medium is inserted in and attached to for reproducing the information recorded on the card-type recording medium; a connection detection device for detecting a state of whether or not the card-type recording medium is electrically connected to the attachment/reproduction device; an insertion detection device for detecting a state of whether or not the card-type recording medium is inserted into the attachment/reproduction device; and a control device for determining the attachment state of the card-type recording medium based on the state detected by the connection detection device and the state detected by the insertion detection device.

The card-type recording media herein include SD cards, MemoryStick (Japanese registered trademark), or the like.

According to the present invention, the apparatus can identify an improper attachment of the card-type recording medium by determining the state of the attachment of the card-type recording medium based on a state detected by the connection detection device and a state detected by the insertion detection device and perform various actions based on the identification, resulting in the improved convenience of the apparatus.

In one aspect of the information reproduction apparatus of the present invention, the apparatus further includes a display device for displaying information, wherein the control device causes the display device to display the determined attachment state of the card-type recording medium.

According to this aspect, the display device can indicate the state of attachment of the card-type recording medium to the user to quickly prompt the user to properly attach the card-type recording medium without making the user mistake improper attachment of the card-type recording medium for a failure in the apparatus.

In another aspect of the information reproduction apparatus of the present invention, the control device causes the display device to display an alarm if the control device determines that the card-type recording medium is in an improper attachment state.

According to this aspect, the display device can indicate the state of attachment of the card-type recording medium to the user to quickly prompt the user to properly attach the card-type recording medium without making the user mistake improper attachment of the card-type recording medium for a failure in the apparatus.

In a further aspect of the information reproduction apparatus of the present invention, the apparatus further includes an input device for inputting a command from a user, wherein the control device causes the display device to display the determined attachment state of the card-type recording medium if a command for selecting the card-type recording medium is inputted from the input device.

According to this aspect, the display device can indicate the state of attachment of the card-type recording medium to the user to quickly prompt the user to properly attach the card-type recording medium without making the user mistake improper attachment of the card-type recording medium for a failure in the apparatus.

In a further aspect of the information reproduction apparatus of the present invention, the control device places the attachment/reproduction device in a reproduction standby state if the insertion detection device detects the insertion state of the card-type recording medium.

According to this aspect, if the insertion detection device detects the insertion of the card-type recording medium, the card-type recording medium can be turned on as a source and the attachment/reproduction device can be placed in a reproduction standby state even if the card-type recording medium is attached improperly.

In a further aspect of the information reproduction apparatus of the present invention, the apparatus further includes an input device for inputting a command from a user, wherein the control device places the attachment/reproduction device in the reproduction standby state if the insertion detection device detects the insertion state of the card-type recording medium and the command for selecting the card-type recording medium is inputted from the input device.

According to this aspect, if the insertion detection device detects the insertion of the card-type recording medium, the card-type recording medium can be turned on as a source and the attachment/reproduction device can be placed in a reproduction standby state even if the card-type recording medium is attached improperly.

In a further aspect of the information reproduction apparatus of the present invention, the control device determines the attachment state of the card-type recording medium based on the state detected by the connection detection device and the state detected by the insertion detection device after a predetermined period of time has elapsed from the detection of the insertion state of the card-type recording medium by the insertion detection device.

According to this aspect, the connection state of the card-type recording medium can be determined taking a case into account where the detection of a connection state by the connection detection device takes some time after the insertion is detected by the insertion detection device.

In a further aspect of the information reproduction apparatus of the present invention, the attachment states determined by the control device include at least a proper attachment state, an improper attachment state, and an eject state.

In a further aspect of the information reproduction apparatus of the present invention, a plurality of the insertion detection devices is provided and the control device determines the attachment state of the card-type recording medium based on the state detected by the plurality of insertion detection devices and the state detected by the connection detection device.

According to this aspect, the type of an improper attachment state of the card-type recording medium can also be determined. Therefore, the convenience of the apparatus can be further improved.

In a further aspect of the information reproduction apparatus of the present invention, the control device determines the attachment state of the card-type recording medium based on the timing of detection by the plurality of insertion detection devices.

According to this aspect, the kinds of attachment states that can be determined can be increased.

In a further aspect of the information reproduction apparatus of the present invention, the attachment state determined by the control device include at least a proper attachment state, an incomplete attachment state, a halfway attachment state, a facedown attachment state, an inverse direction attachment state, and an eject state.

A halfway-attachment state herein is an improper attachment state in which the card-type recording medium is inserted right side up and halfway in the attachment/reproduction device. A facedown attachment state is an improper attachment state in which the card-type recording medium is attached right side down to the attachment/reproduction device. An inverse attachment state is an improper attachment state in which the card-type recording medium is attached to the attachment/reproduction device in the inverse direction. An incomplete attachment state is one of any other improper attachment states (such as loose connection, for example) than the above-described improper states.

BRIEF DESCRIPTION OF THE DRAWINGS

FIG. 7 shows a block diagram of an exemplary internal configuration of an attachment/reproduction module 20 in a second embodiment;

FIGS. 8A to 8D show the states of an attachment of the card-type recording medium 10 in the second embodiment;

FIGS. 13A to 13C show the states of the attachment of a prior-art card-type recording medium 10.

DETAILED DESCRIPTION OF THE PREFERRED EMBODIMENTS

Figure 1:
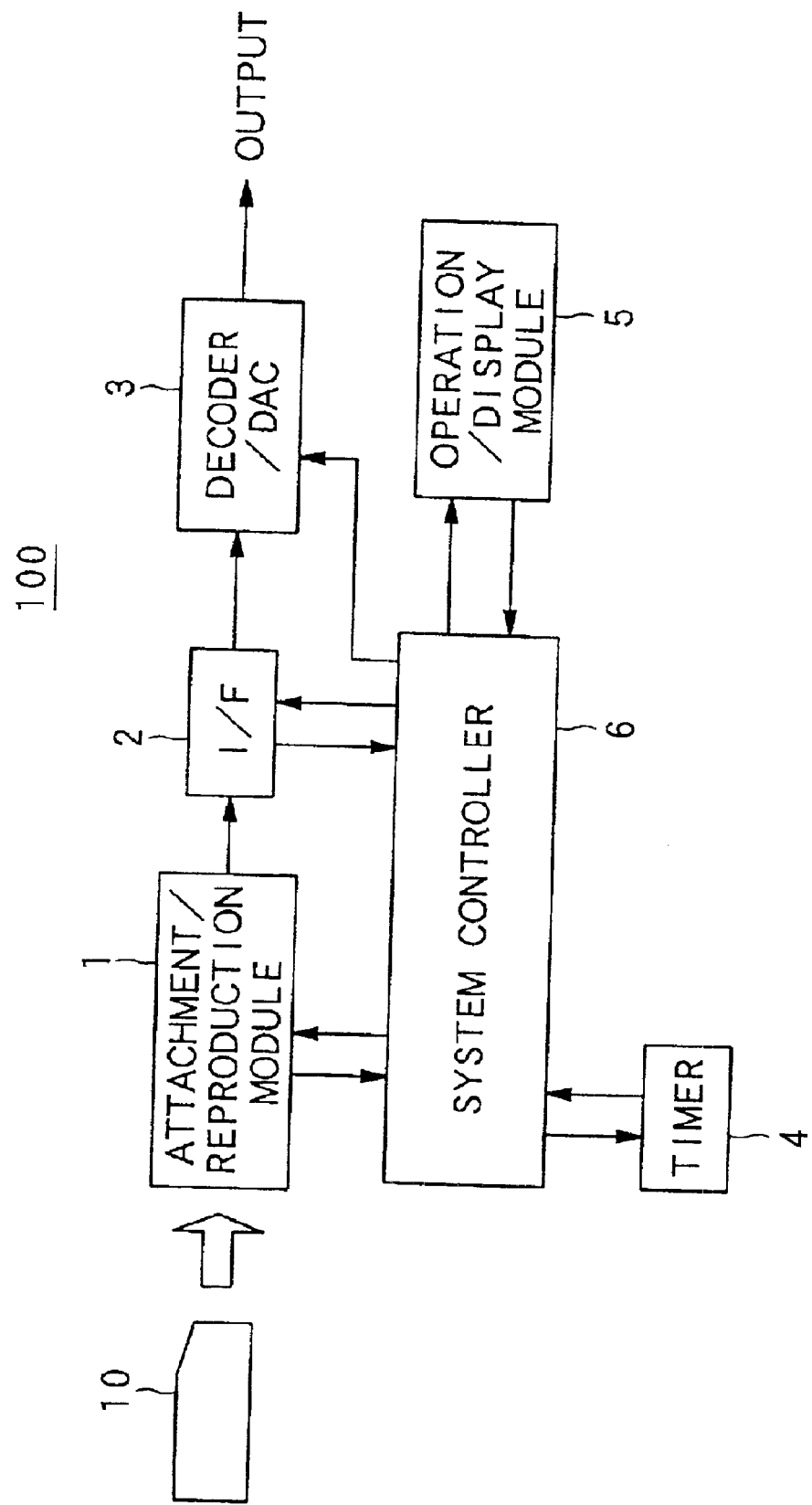
FIG. 1 is a block diagram of an exemplary configuration of an information reproduction apparatus 100 according to an embodiment.

Preferred embodiments of the present invention will be described below with respect to the accompanying drawings. FIG. 1 is a block diagram of an exemplary configuration of an information reproduction apparatus 100 according to an embodiment. The information reproduction apparatus 100 may be used in a unit such as a home or on-vehicle audio apparatus, for example. As shown in FIG. 1, the information reproduction apparatus 100 includes an attachment/reproduction module 1 as an attachment/reproduction device, a card-type recording medium interface (I/F) 2, a decoder/digital-analog converter (DECODER/DAC) 3, a timer 4, an operation/display module 5 as a display device and an input device, and a system controller 6 as a control device.

(First Embodiment)

Figure 2:
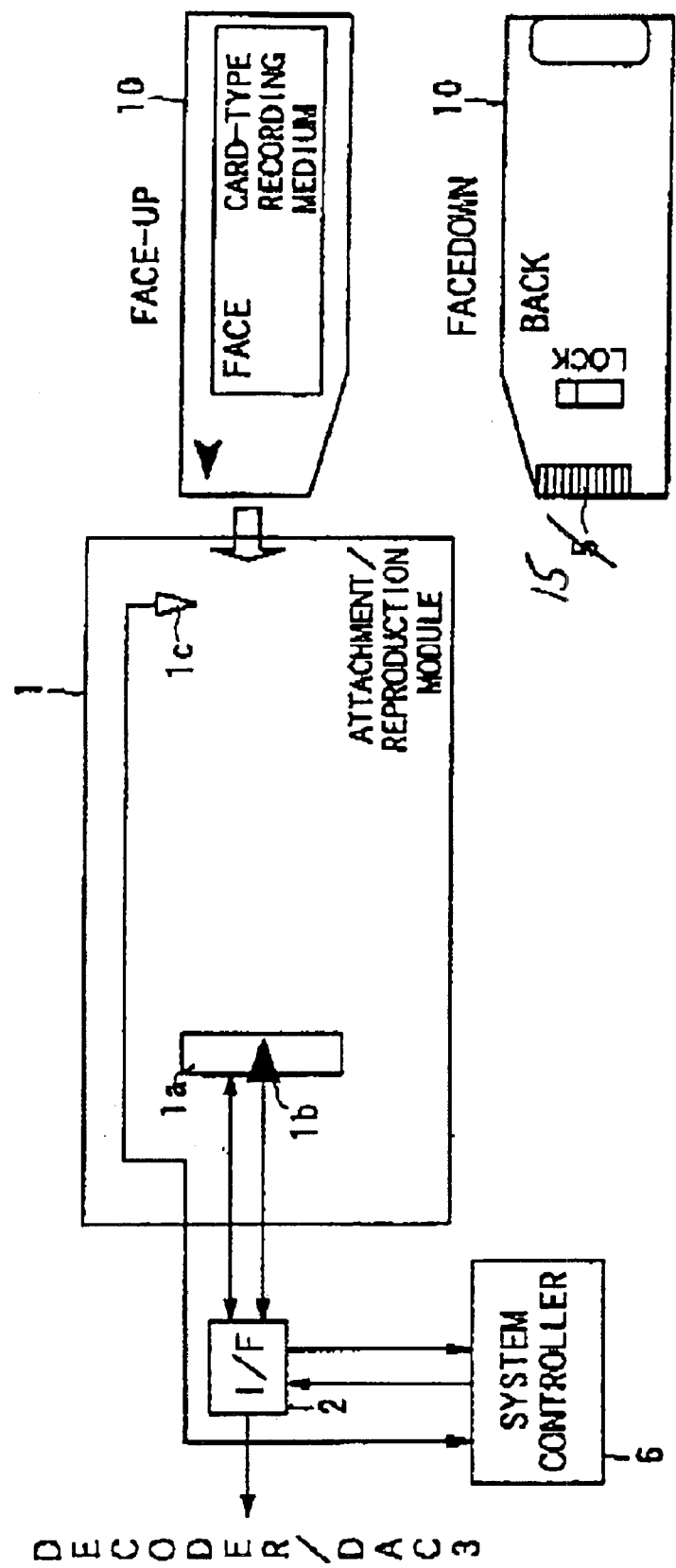
FIG. 2 is a block diagram of an exemplary internal configuration of an attachment/reproduction module 1 according to a first embodiment.

FIG. 2 shows a block diagram of an exemplary internal configuration of the attachment/reproduction module 1 in a first embodiment. As shown in FIG. 2, the attachment/reproduction module 1 provided with a card-type-recording-medium connector 1a, a connection detection switch (SW) 1b as a connection detection device, and an insertion detection switch (SW) 1c as an insertion detection device. A card-type recording medium 10 is inserted in the attachment/reproduction module 1 and attached to the card-type-recording-medium connector 1a.

The connection detection switch (SW) 1b is means for detecting whether the card-type recording medium 10 is electrically connected to the card-type-recording-medium connector 1a. Metal terminals 15 including terminals such as a power supply terminal, data input/output terminals, a serial clock input terminal, an attachment detection terminal, and a ground terminal are disposed on the back of the card-type recording medium 10. The attachment detection terminal is grounded within the card-type recording medium 10 and connected to a power supply through a pull-up resistor of the attachment/reproduction module 1. The attachment detection terminal of the card-type recording medium 10 is at the "H" level in a state in which it is out of contact with the connection detection SW 1b of the attachment/reproduction module 1 (hereinafter called "improper attachment state), or at the "L" level in a state in which it is in contact with the connection detection SW 1b (hereinafter called "proper attachment state"). Therefore, the attachment detection terminal remains at "H" level in an improper attachment state such as a state in which the attachment detection terminal is not completely in contact with the connection detection SW 1b (hereinafter "incomplete attachment state"), a state in which the card-type recording medium 10 is inserted right side up and halfway in the attachment/reproduction module 1 (hereinafter called "face-up halfway attachment state"), a state in which the card-type recording medium 10 is inserted right side down and halfway in the attachment/reproduction module 1 (hereinafter called "facedown halfway attachment state"), or in a state in which the card-type recording medium 10 is inserted in the inverse direction and halfway in the attachment/reproduction module 1 (hereinafter called "inverse halfway attachment state"). The attachment/reproduction module 1 in this embodiment has a structure that allows the card-type recording medium 10 to be inserted only halfway if the card-type recording medium 10 is inserted facedown or in the inverse direction in the attachment/reproduction module 1.

The connection detection SW 1b detects the "H" or "L" level state and communicates the state to the system controller 6 through the card-type-recording-medium I/F 2.

The insertion detection SW 1c is means for detecting whether or not the card-type recording medium 10 is inserted in the attachment/reproduction module 1. A physical (mechanical) switch, for example, may be used as the insertion detection SW 1c. The insertion detection SW 1c may be any device that can detect whether or not the card-type recording medium 10 is inserted into the attachment/reproduction module 1. For example, it may be configured to detect an insertion state in an electrical, magnetic, or optical manner. The state of the card-type recording medium 10 detected by the insertion detection SW 1c is communicated to the system controller 6.

Returning to FIG. 1, the card-type recording medium I/F 2 reads digital data stored on the card-type recording medium 10 and outputs it to the DECODER/DAC 3, based on a control instruction issued by the system controller 6. The DECODER/DAC 3 decodes the digital data, converts it into an analog signal, and outputs it to a monitor or loudspeakers. Digital data such ma video data and audio data is stored on the card-type recording medium 10. Details of the data processing do not directly concern the present invention and therefore will be omitted herein.

Figure 3:
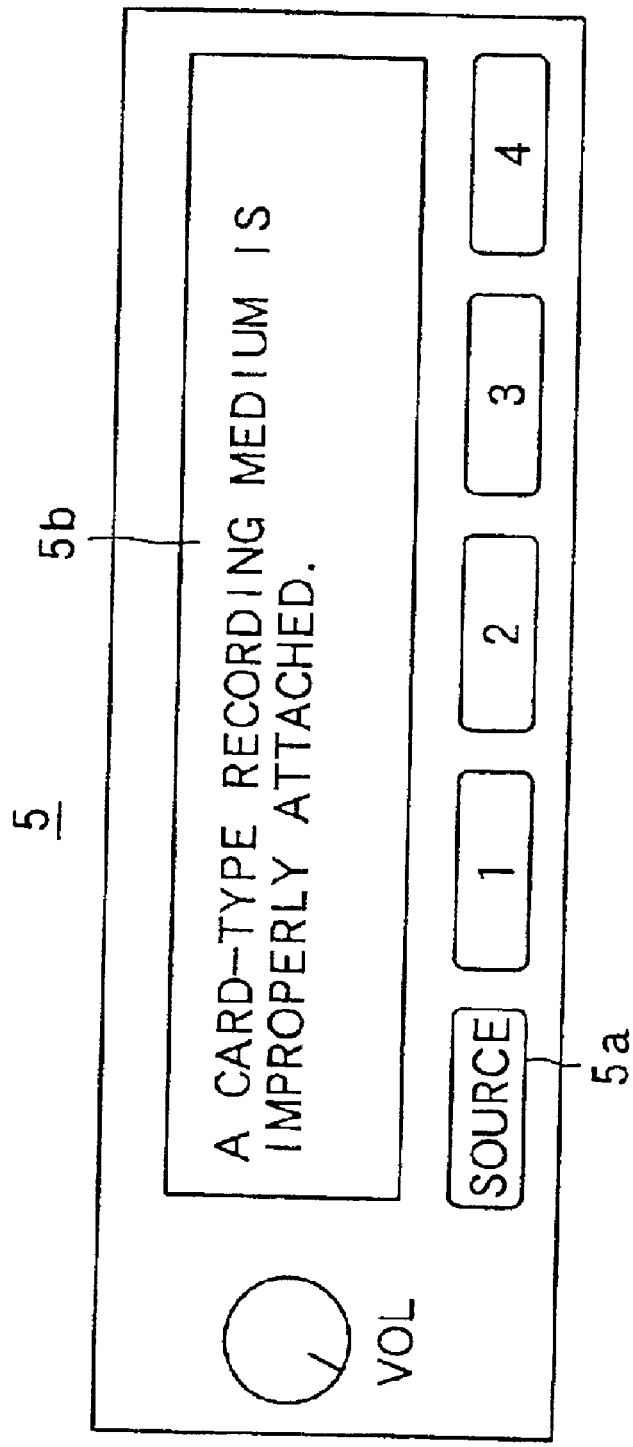
FIG. 3 shows an exemplary external configuration of an operation/display module 5.
Figure 4A:
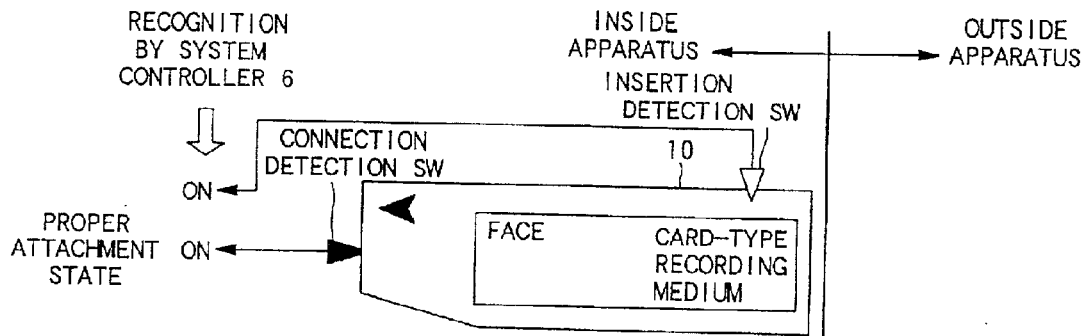
FIGS. 4A to 4D show attachment states of a card-type recording medium 10 in the first embodiment.
Figure 4B:
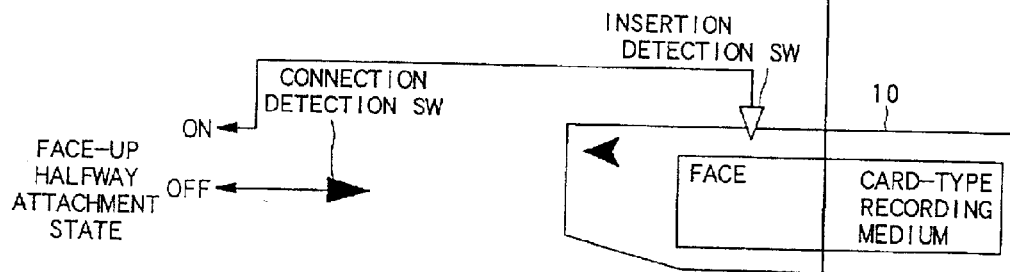
Figure 4C:
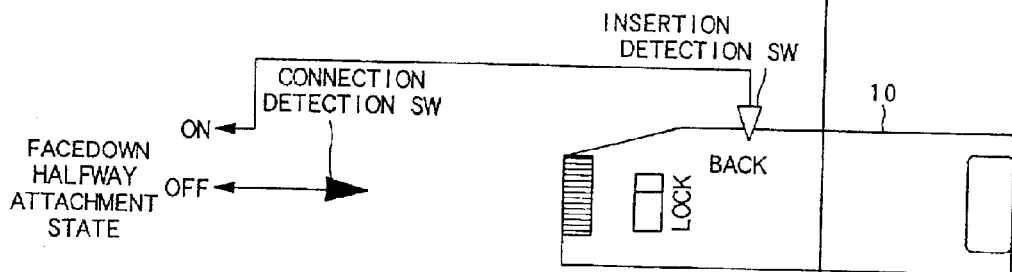
Figure 4D:
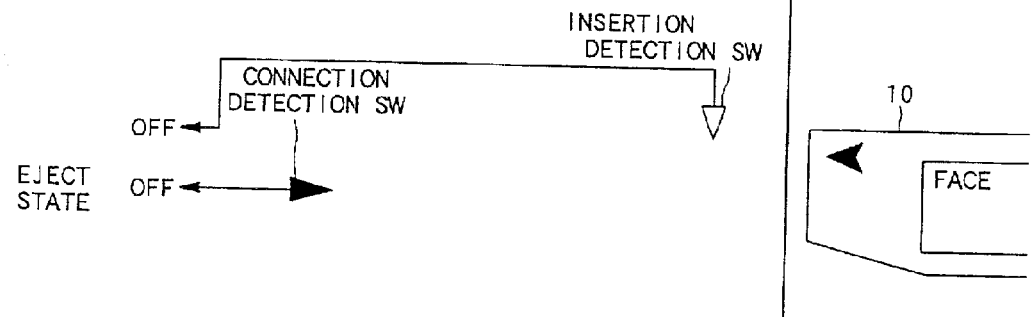

The timer 4 is used in a process, which will be described later, performed by the system controller 6 for detecting an improper attachment of the card-type recording medium 10. The operation/display module 5 has an external configuration as shown in FIG. 3 and includes selection keys for selecting information (such as music) to be reproduced and a source key 5a. The source key 5a is used for selecting a source and allows a user to select a source from among a card-type recording medium source and other sources. Provided on the operation/display module 5 is a display 5b for displaying information such as an instruction to a user for selecting information to be reproduced and the attachment state of the card-type recording medium 10. In an example shown in FIG. 3, a message indicating that the card-type recording medium is improperly inserted is displayed on the display 5b.

The system controller 6 is formed by a microcomputer including a CPU, RAM, and ROM and controls inputs/outputs among the attachment/reproduction module 1, the card-type recording medium I/F 2, the DECODER/DAC 3, the timer 4, and the operation/display module 5 and the reproduction of digital data stored on the card-type recording medium 10.

The system controller 6 also determines the attachment state of the card-type recording medium 10 based on the state detected by the connection detection SW 1b of the attachment/reproduction module 1 and the state detected by the insertion detection SW 1c and performs control according to the result of the determination. More specifically, the system controller 6 discriminates among the following three attachment states of the card-type recording medium 10: a proper attachment state, an improper attachment state (including an incomplete attachment state, a face-up halfway attachment state, a facedown halfway attachment state, and an inverse halfway attachment state), and an eject state according to an improper attachment detection program stored in ROM based on a state detected by connection detection SW 1b and a state detected by the insertion detection SW 1c, and if the card-type recording medium 10 is in an improper attachment state, displays an alarm indicating the improper state on the display 5b of the operation/display module 5.

FIG. 4 shows the attachment states of the card-type recording medium 10 in the first embodiment. FIG. 4A shows a state in which the card-type recording medium 10 is in the proper attachment state. In this case, the system controller 6 recognizes the state detected by the connection detection SW 1b and insertion detection SW 1c as the "ON" state. FIG. 4B shows the face-up halfway attachment state of the card-type recording medium 10. In this case, the system controller 6 recognizes the state detected by the connection detection SW 1b as "OFF" and the state detected by the insertion detection SW 1c as the "ON" state. FIG. 4C shows the facedown attachment state of the card-type recording medium 10. In this case, the system controller 6 recognizes the states as the same states as in the face-up halfway attachment state in FIG. 4B. FIG. 4D shows the eject state of the card-type recording medium 10. In this case, the system controller 6 recognizes both of the states detected by the connection detection SW 1b and the insertion detection SW 1c as the "OFF" state.

Figure 5:
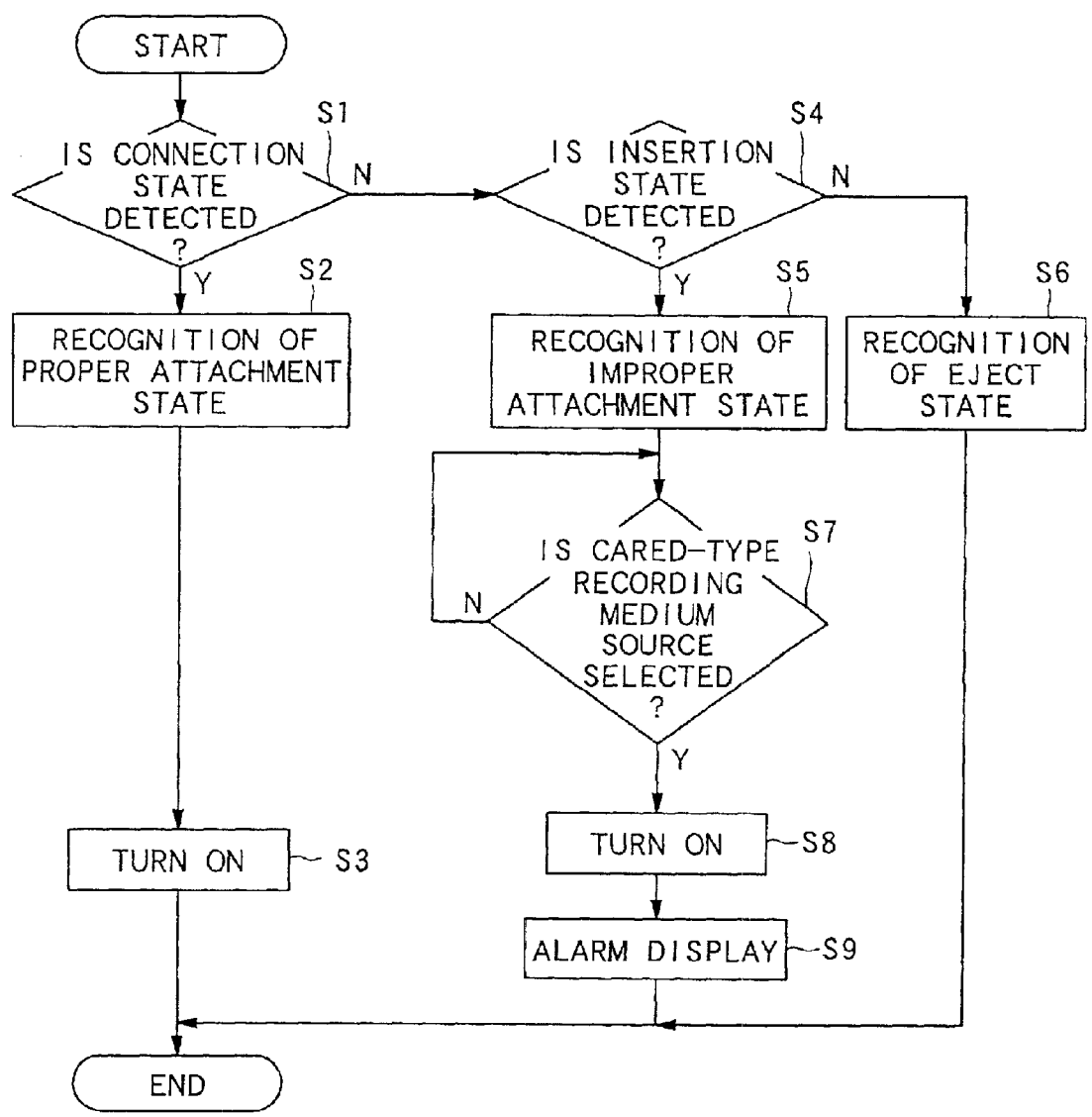
FIG. 5 shows a flowchart of an improper attachment detection process performed by a system controller 6 according to the first embodiment.

FIG. 5 shows a flowchart of an improper attachment detection process performed by the system controller 6 according to the first embodiment. In the process shown in FIG. 5, the system controller 6 first determines whether a connection state of the card-type recording medium 10 has been detected by the connection detection SW 1b (step S1). If the system controller 6 determines that the connection state is detected (recognizes "ON"), it recognizes the proper attachment state (FIG. 4A) (step S2) and turns on the card-type recording medium 10. That is, it places the attachment/reproduction module 1 into a reproduction standby state (step S3). In this case, the system controller 6 may display an indication of the proper attachment state on the display 5b of the operation/display module 5.

If the system controller 6 determines at step S1 that the connection state is not detected (recognizes "OFF"), then it determines whether th insertion state of the card-type recording medium 10 has been detected by the insertion detection SW 1c (step S4). If the insertion state has been detected (recognized u "ON"), the system controller 6 recognizes it as an improper attachment state (FIG. 4B or 4C) (step S5). And, if the a user selects the card-type recording medium source with the source key 5a on the operation/display module 5, the system controller 6 responds to it (step S7) to turn on the card-type recording medium 10 (step S8), and display an alarm indicating the improper attachment state on the display 5b of the operation/display module 5 (step 89). The alarm may include a message instructing the user how to attach the card-type recording medium 10 properly.

If the system controller 6 determines that the insertion state is not detected (recognized as "OFF"), it recognizes the state as the eject state (FIG. 4D) (step S6) and ends the process without turning on the card-type recording medium 10.

In the example shown in FIG. 2, it may take some time for the connection state to be detected by the connection detection SW 1b after the insertion state is detected by the insertion detection SW 1c (for example if the medium is inserted slowly). Therefore, the apparatus may be configured in such a way that, taking the required time into account, if the insertion state is detected by the insertion detection SW 1c at step S4 in the process shown in FIG. 5, the timer 4 is activated, and, only if a connection state has not been detected by connection detection SW 1b after a predetermined period of time has elapsed, the improper attachment state is detected at step 5. This is equivalent to an action in which the system controller 6 determines the attachment state of the card-type recording medium 10 after the predetermined period of time has elapsed from the detection of the insertion state of the card-type recording medium 10 by the insertion detection SW 1c.

The above-described process is performed repeatedly and periodically by the system controller 6 (the same applies to processes shown in flowcharts described hereinafter).

As described above, according to the first embodiment, an improper attachment state of the card-type recording medium 10 can be identified based on the states detected by both of the connection detection SW 1b and insertion detection SW 1c, and the improper attachment state can be indicated to the user. In particular, even if the card-type recording medium 10 is in the improper attachment state, the card-type recording medium 10 can be turned on, therefore allowing the improper attachment state to be indicated to the user. As a result, the apparatus can prompt the user to properly attach the card-type recording medium 10 without making the user mistake the improper attachment as a failure in the apparatus. Thus, the convenience of the apparatus can be improved.

Figure 6:
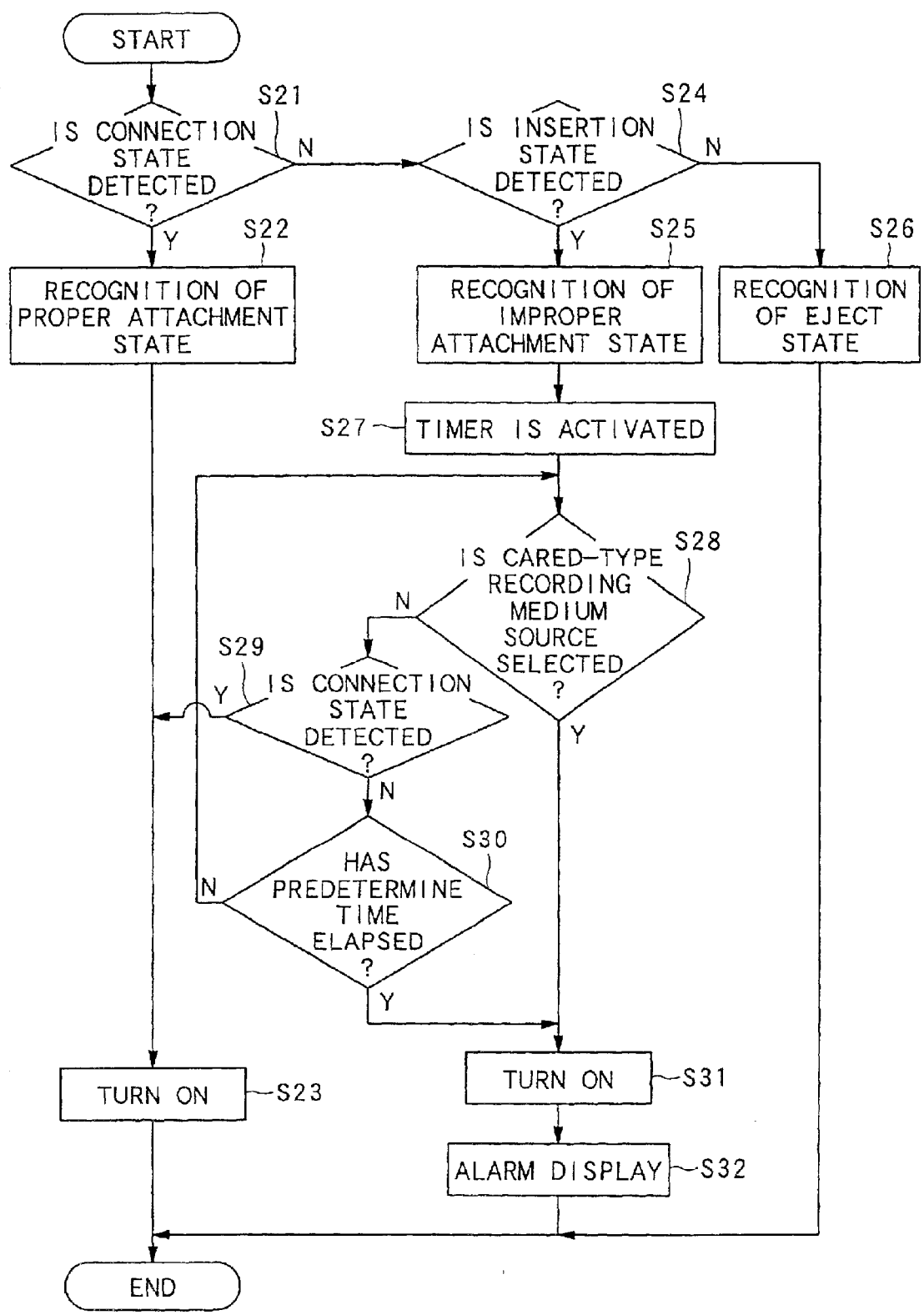
FIG. 6 shows a flowchart of a variation of the process in FIG. 5 performed by the system controller 6.

FIG. 6 shows a flowchart of a variation of the process in the system controller 6 shown in FIG. 5. Steps of the process in FIG. 6 that are the same as those in the process shown in FIG. 5 are omitted. After an improper attachment state of a card-type recording medium 10 is found at step S25 (which corresponds to step S5 in FIG. 5) in the process shown in FIG. 6, the system controller 6 activates the timer (step S27). If the user does not select the card-type recording medium source with the source key 5a on the operation/display module 5 (step S28), the system controller 6 determines whether a connection state has been detected by the connection detection SW 1b (step S29).

If it is determined that the connection state has been detected (recognized as "ON"), the process proceeds to step S23. On the other hand, if it is determined that no connection state has been detected (recognized as "OFF"), the system controller 6 determines whether a predetermined period of time has elapsed (stop S30), and, if the predetermined period of time has elapsed, turns on the card-type recording medium 10 (step S31) and displays an alarm on the display 5b of the operation/display module 5 for indicating an improper attachment state (step S32). By configuring the apparatus in this way, if the user does not select a card-type recording medium source with the source key 5a on the operation/display module 5, an alarm can be automatically displayed to indicate the improper attachment state to the user before the user tries to diagnose why the card-type recording medium 10 (step 23) cannot be turned on, thereby improving convenience to the user.

FIG. 7 shows a block diagram of an exemplary internal configuration of the attachment/reproduction module 20 in a second embodiment. In the configuration of the second embodiment, the attachment/reproduction module 1 of the information reproduction apparatus 100 in FIG. 1 is replaced with the attachment/reproduction module 20. As shown in FIG. 7, the attachment/reproduction module 20 includes a card-type recording medium connector 20a a connection detection switch (SW) 20b as a connection detection device, a first insertion detection switch (SW) 20a as an a insertion detection device, and a second insertion detection switch (SW) 20d as an a insertion detection device. Description of the same components as those in the first embodiment will be omitted in the following description.

The example shown in FIG. 7 is different from the example shown in FIG. 2 in that the example in FIG. 7 includes as an insertion detection device two switches, the first insertion detection SW 20c and second insertion detection SW 20d, and these switches are provided near the center of the attachment/reproduction module 20. In this example, each of the first and second insertion detection SWs 20c and 20d detects whether or not a card-type recording medium 10 is inserted. When the card-type recording medium 10 is inserted, both ends of the card-type recording medium 10 which are orthogonal to the insertion direction are sandwiched between the first and second insertion detection SWs 20c and 20d as shown.

One of the edges of the card-type recording medium 10 orthogonal to the insertion direction (a portion indicated by reference number 10a) is chipped as shown. When the chipped portion 10a is at one of the insertion detection SWs, the card-type recording medium 10 does not contact the insertion detection SW, therefore the insertion state of the card-type recording medium is not detected. Thus, for example, if the card-type recording medium 10 is inserted face-up and halfway in the attachment/reproduction module 20 (a face-up halfway attachment state), the first insertion detection SW 20c detects the insertion state of the card-type recording medium 10 but the second insertion detection SW 20d does not detect the insertion state of the card-type recording medium 10.

In addition, if the card-type recording medium 10 is facedown and halfway inserted into the attachment/reproduction module 20 (a facedown halfway attachment state), the second insertion detection SW 20d detects the insertion state of the card-type recording medium 10 but the first insertion detection SW 20c does not detect the insertion state of the card-type recording medium 10. Therefore, the system controller 6 can discriminate between the face-up halfway attachment state and face down halfway attachment state.

Thus, the system controller 6 discriminates among five states, that is, a proper attachment state, a face-up halfway attachment state, a facedown attachment state, an inverse halfway attachment state (or incomplete attachment state), and an eject state of the card-type recording medium 10 in accordance with an improper attachment detection program stored in ROM and based on a state detected by the connection detection SW 20*b*, a state detected by the first insertion detection SW 20*c*, and a state detected by the second insertion detection SW 20*d*, and then displays an indication on the display 5*b* on the operation/display module 5 according to the determined attachment state. As with the first embodiment, the attachment/reproduction module 20 is structured in such away that the card-type recording medium 10 can be inserted only halfway if it is inserted facedown or in the inverse direction in the attachment/reproduction module 20.

FIGS. 8 and 9 show states of the attachment of the card-type recording medium 10 in the second embodiment.

FIG. 8A shows a card-type recording medium 10 in a proper attachment state. In this case, the system controller 6 recognizes states detected by the connection detection SW 20*b* and the insertion detection SWs 20*c* and 20*d* as the "ON" state. FIG. 8B shows card-type recording medium 10 in face-up halfway attachment state. In this case, the system controller 6 recognizes a state detected by the connection detection SW 20*b* as the "OFF" state, a state detected by the first insertion detection SW 20*c* as the "ON" state, and a state detected by the second insertion detection SW 20*d* as the "OFF" state.

FIG. 8C shows the card-type recording medium 10 in an improper attachment state. In this case, the system controller 6 recognizes a state detected by the connection detection SW 20*b* as the "OFF" state, a state detected by the first insertion detection SW 20*c* as the "ON" state, and a state detected by the second insertion detection SW 20*d* as the "ON" state. FIG. 8D shows the card-type recording medium 10 in the eject state. In this case, the system controller 6 recognizes states detected by all of the SWs as the "OFF" state.

Figure 9A:
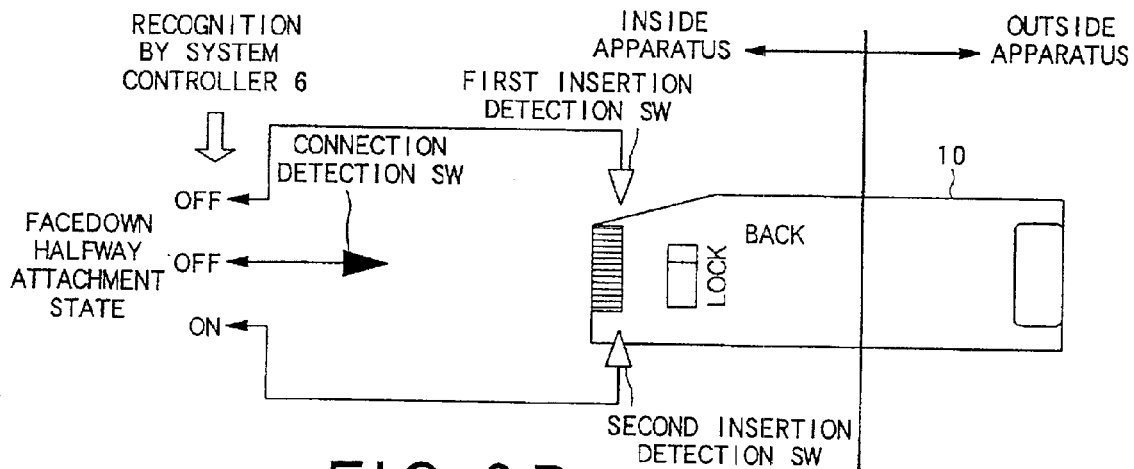
FIGS. 9A to 9C show the states of the attachment of the card-type recording medium 10 in the second embodiment.
Figure 9B:
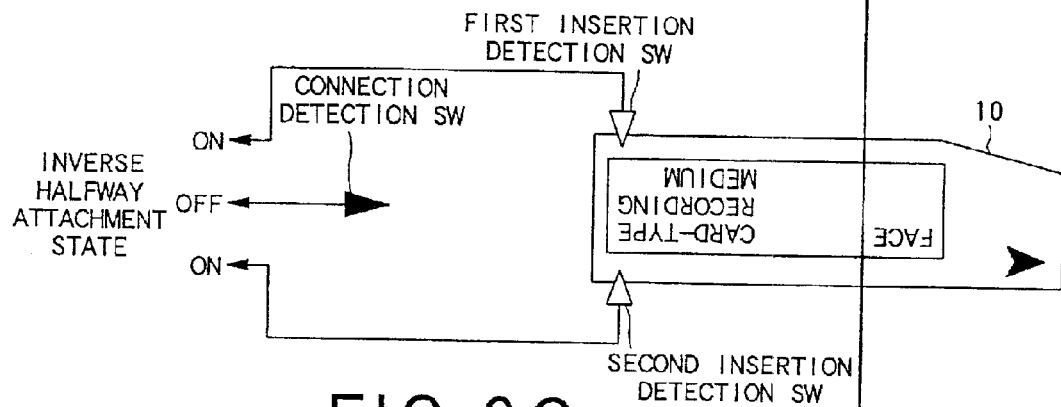
Figure 9C:
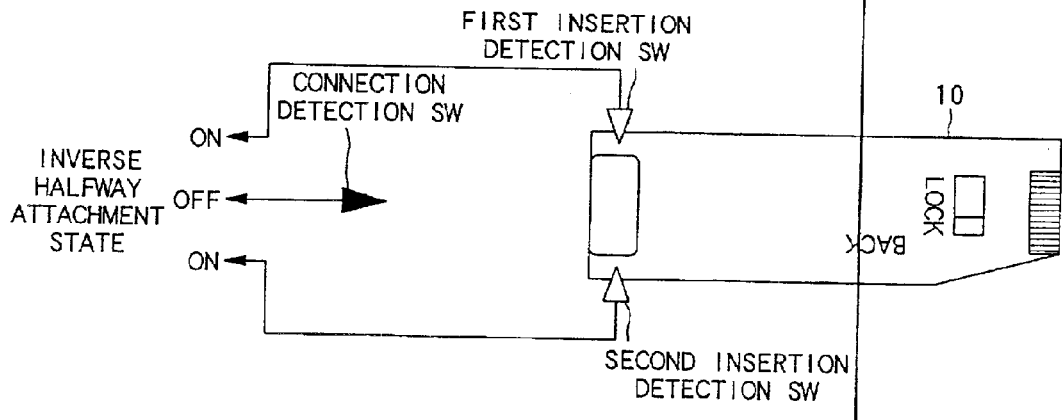

FIG. 9A shows the card-type recording medium 10 in the facedown halfway attachment state. In this case, the system controller 6 recognizes a state detected by the connection detection SW 20*b* as the "OFF" state, a state detected by the first insertion detection SW 20*c* as the "OFF" state, and a state detected by the second insertion detection SW 20*d* as the "ON" state. FIGS. 9B and 9C show the card-type recording medium 10 in the inverse halfway attachment state. In this case, the system controller 6 recognizes a state detected by the connection detection SW 20*b* as the "OFF" state, a state detected by the first insertion detection SW 20*c* as the "ON" state, and a state detected by the second insertion detection SW 20*d* as the "ON" state.

Figure 10:
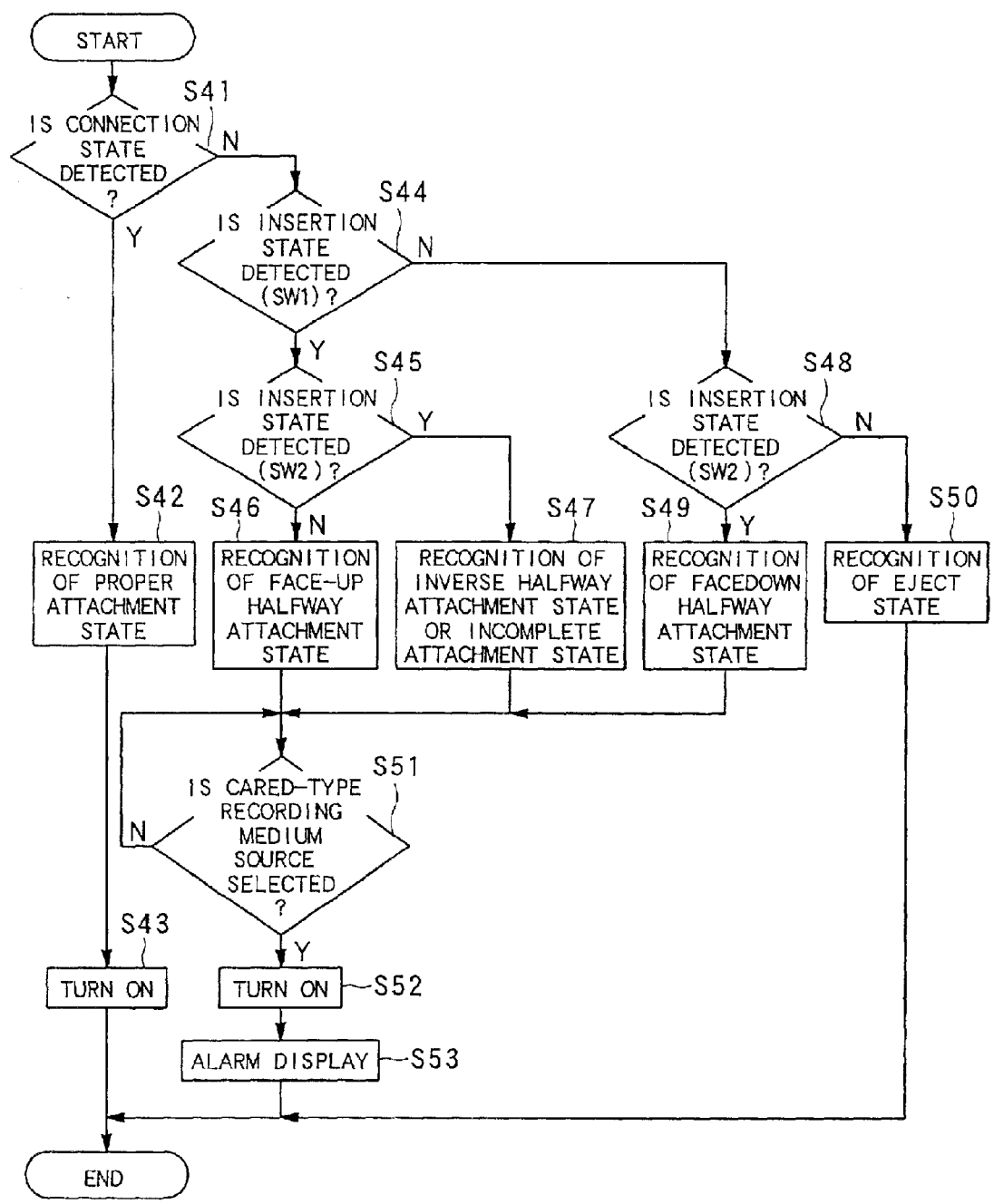
FIG. 10 shows a flowchart of an improper attachment detection process performed by a system controller 6 according to the second embodiment.

FIG. 10 shows a flowchart of an improper attachment detection process in the system controller 6 according to the second embodiment. In the process shown in FIG. 10, the system controller 6 first determines whether the connection state of a card-type recording medium 10 is detected by the connection detection SW 20*b* (step S41). If the system controller 6 determines that the connection state is detected (it recognizes it as "ON"), it recognizes the proper attachment state (FIG. 8A) (step S42) and turns on the card-type recording medium 10, that is, it places the attachment/reproduction module 20 in a reproduction standby state (step S43).

On the other hand, if no connection state is detected at step S41 (recognized as "OFF"), the system controller 6 determines whether an insertion state of the card-type recording medium 10 is detected by the first insertion detection SW 20*c* (step S44). If the system controller 6 determines that the insertion state is detected (recognizes as "ON"), the process proceeds to step S45. If, on the other hand, the system controller 6 determines that no insertion state is detected (recognizes as "OFF"), the process proceeds to step S48.

At step S45, the system controller 6 determines whether an insertion state of the card-type recording module 10 is detected by the second insertion detection SW 20*d*, and if no insertion state is detected (recognizes as "OFF"), recognizes the face-up halfway attachment state (FIG. 8B) (step S46), then the process proceeds to step S51. On the other hand, if an insertion state is detected (recognized as "ON"), the system controller 6 recognizes an incomplete attachment state (FIG. 8C) or an inverse halfway attachment state (FIG. 9B or 9C) (step S47), then the process proceeds to step S51.

The system controller 6 also determines at step S48 whether the insertion state of the card-type recording medium 10 is detected by the second insertion detection SW 20*d* and, if the insertion state is detected (recognized as "ON"), recognizes a facedown attachment state (FIG. 9A), then the process proceeds to step S51.

On the other hand, if the insertion state is not detected (recognized as "OFF"), the system controller 6 recognizes an eject state (FIG. 8D) (step S50) and ends the process without turning on the card-type recording medium 10.

At step S51, the system controller 6 waits for the selection of the card-type recording medium source made by the user with the source key 5*a* on the operation/display module 5. When selection is made, the process proceeds to step S52 in response to it.

Then, the system controller 6 turns on the card-type recording medium 10 (step S52) and displays an alarm on the display 5*b* on the operation/display module 5 according to the attachment state (step S53). That is, an alarm indicating one of the face-up halfway attachment state, facedown halfway attachment state, and incomplete full attachment state (or inverse halfway attachment state) that is recognized in the above-described process is displayed (for example, a message, "Card-type recording medium is attached facedown," is displayed). As with the first embodiment, a message may be included that instructs the user how to attach the card-type recording medium 10 properly.

In the same manner as the process in the first embodiment shown in FIG. 5, a time difference between detections at the insertion detection SWs and detection at the connection detection SW may be taken into account in the process in FIG. 10. In addition, like the process in the first embodiment shown in FIG. 6, if the user does not select the card-type recording medium source with the source key 5*b* on the operation/display module 5, an alarm may be automatically displayed in the process in FIG. 10.

While the incomplete attachment state and inverse halfway attachment state cannot be discriminated at step S47, discrimination between the incomplete attachment state and inverse halfway attachment state becomes possible by configuring the apparatus so as to make determination of attachment state based on the timing of detections by the first insertion detection SW 20*c* and the second insertion detection SW 20*d*. That is, there is a time difference between detection by the first insertion detection SW 20*c* and detection by the second insertion detection SW 20*d* if the card-type recording medium is inserted in the proper direction because the card-type recording medium 10 has a chipped portion 10*a*. The detection time difference can be used to discriminate between an incomplete attachment state and an inverse halfway attachment state.

Figure 11:
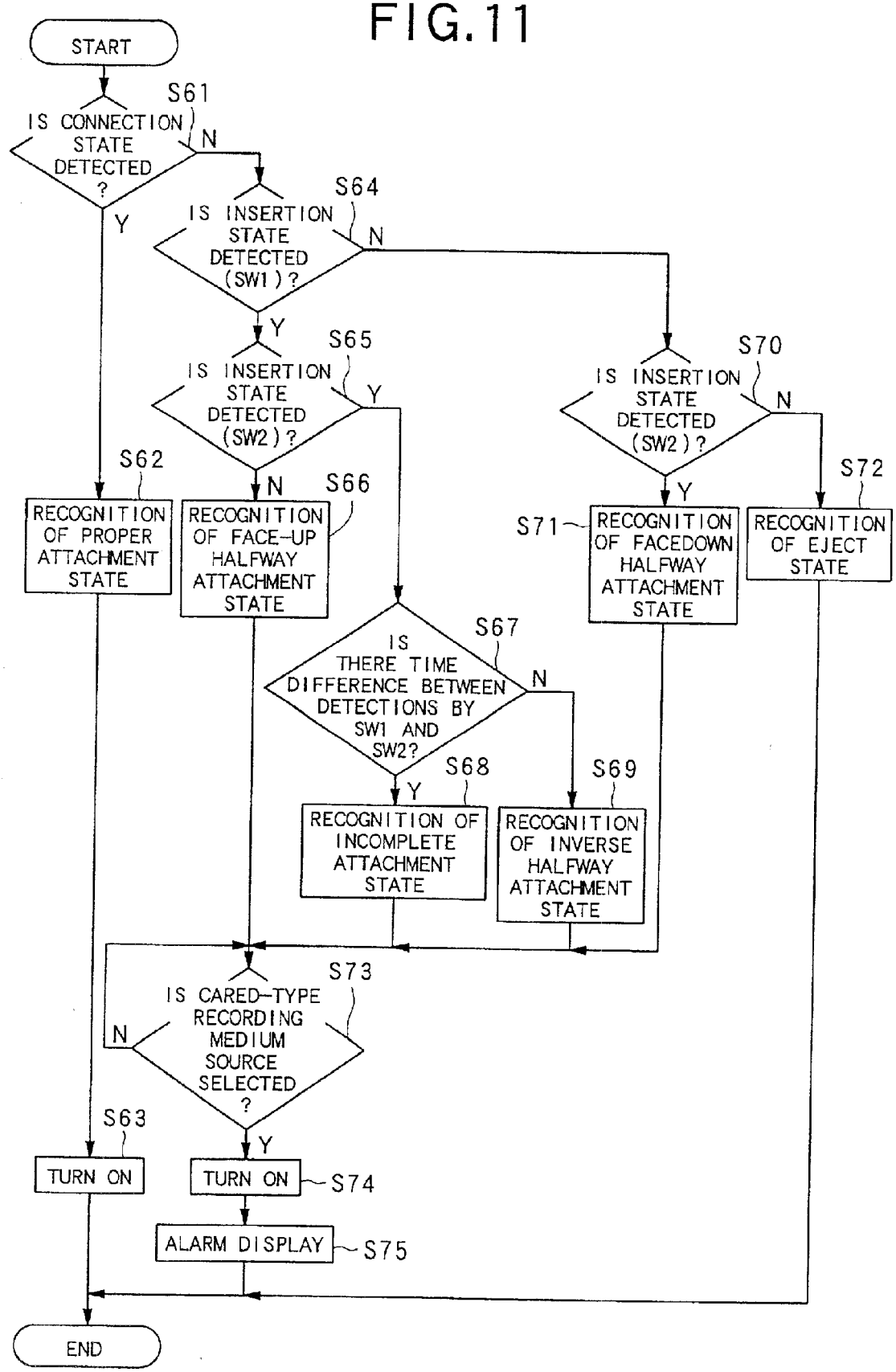
FIG. 11 shows a flowchart of an improper attachment detection process performed by the system controller 6 in a case where the attachment state is determined based on the timing of detection by a first insertion detection SW 20c and a second insertion detection SW 20d.
Figure 12A:
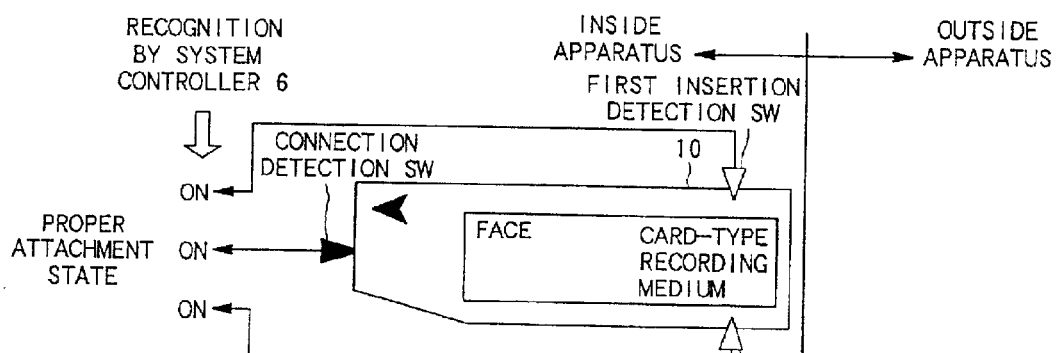
FIGS. 12A to 12D show the states of the attachment of the card-type recording medium 10 in another embodiment.
Figure 12B:
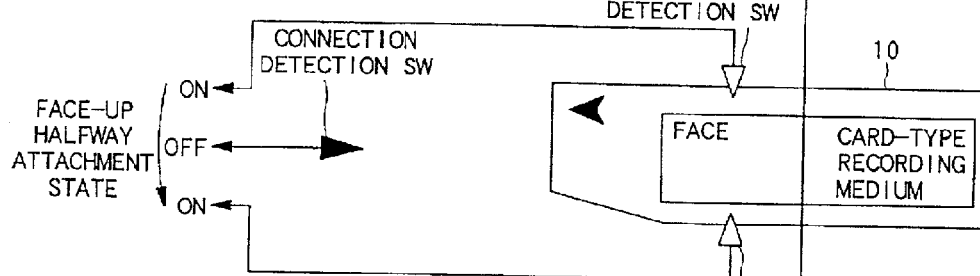
Figure 12C:
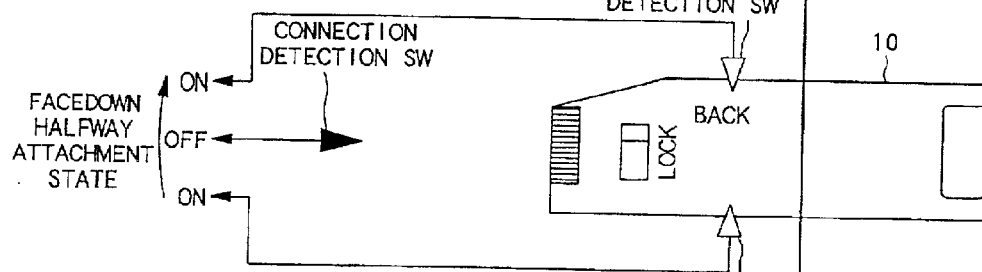
Figure 12D:
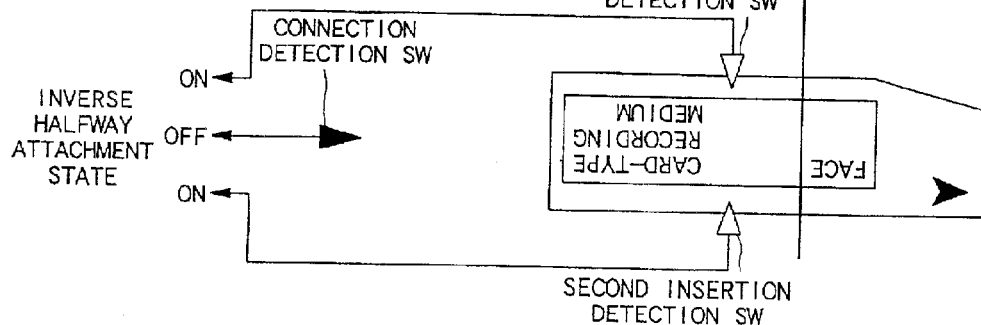

FIG. 11 shows a flowchart of an improper attachment detection process in the system controller 6, in which an attachment state is determined based on the timing of detection by the first insertion detection SW 20*c* and the second insertion detection SW 20*d*.

At step S67 in the process in FIG. 11, it is determined whether there is a predetermined time difference between the timing of detection by the first insertion detection SW 20c and the timing of detection by the second insertion detection SW 20d. If there is the predetermined time difference between the detections by the first insertion detection SW 20c and the second insertion detection SW 20d, the system controller 6 recognizes an incomplete attachment state (FIG. 8C) (step S68). On the other hand, if there is not the predetermined time difference between the detections, the system controller 6 recognizes an inverse attachment state (FIG. 9B or 9C) (step S69). The predetermined time is set in consideration of factors such as speeds at which the card-type recording medium 10 is inserted. The remaining steps in FIG. 11 are the same as those in FIG. 10 and therefore the description of which are omitted.

As described above, the second embodiment provides the same advantages as those of the first embodiment, and in addition, enables the identification of the type of improper attachment states (a face-up halfway attachment state, a facedown halfway attachment state, an incomplete attachment state, and an inverse attachment state) based on the detection states by the connection detection SW and two insertion detection SWs and can indicate the identified type or improper attachment state to the user, thereby further improving the convenience of the apparatus.

While the first and second insertion detection SWs 20c and 20d are disposed near the center of the attachment/reproduction module 20 in the second embodiment, they may be disposed near a slot in the attachment/reproduction module 20 in another embodiment as shown in FIG. 12. In this configuration, discrimination among a face-up halfway attachment state (FIG. 12B), facedown halfway attachment state (FIG. 12C), and inverse halfway attachment state (FIG. 12D) is accomplished based on a time difference between detections by the first insertion detection SW 20c and the second insertion detection SW 20d.

While two insertion detection SWs are provided to extend the range of the determination of the attachment state of the card-type recording medium in the second embodiment, the number of the insertion detection SWs is not limited to two. More insertion detection SWs may be provided (in front of or at the rear of the card-type recording medium, for example) to identify more types of attachment states.

In addition, more chipped portions may be provided on the card-type recording module to improve matching between the card-type recording module and insertion detection SWs, thereby allowing more types of attachment states to be identified.

According to the present invention, an improper attachment state of a card-type recording medium is determined based an both of a state detected by the connection detection SW and a state detected by the insertion detection SW as described above, and the improper attachment state can be indicated to the user. In particular, even if the card-type recording medium is in an improper attachment state, the card-type recording medium can be turned on, therefore the improper attachment state can be indicated to the user and, as a result, the user can be quickly prompted to properly attach the card-type recording medium without mistaking improper attachment of the card-type recording medium for a failure in the apparatus. Thus, the convenience of the apparatus can be improved.

Furthermore, a plurality of insertion detection SWs are provided to allow the type of improper attachment state of the card-type recording medium also be determined based on the states detected by the SWs and the connection detection SW, therefore the type of the improper attachment state can also be indicated to the user. Thus, the convenience of the apparatus can be further improved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-164866 filed on May 31, 2001 including the specification, claims, drawings and summary is incorporated herein by reference in its entirety.

What is claimed is:

1. An information reproduction apparatus for reproducing information recorded on a card-type recording medium, comprising:

an attachment/reproduction device which the card-type recording medium is inserted in and attached to for reproducing the information recorded on the card-type recording medium;

a connection detection device for detecting a state of whether or not the card-type recording medium is electrically connected to the attachment/reproduction device;

an insertion detection device for detecting a state of whether or not the card-type recording medium is inserted into the attachment/reproduction device; and a control device for determining the attachment state of the card-type recording medium based on the state detected by the connection detection device and the state detected by the insertion detection device, wherein the control device determines any one improper attachment state from among a plurality of mutually different improper attachment states.

2. The information reproduction apparatus according to claim 1, further comprising a display device for displaying information, wherein the control device causes the display device to display the determined improper attachment state of the card-type recording medium.

3. The information reproduction apparatus according to claim 2, wherein the control device causes the display device to display an alarm based on the determined improper attachment state of the card-type recording medium.

4. The information reproduction apparatus according to claim 2, further comprising an input device for inputting a command from a user, wherein the control device causes the display device to display the determined improper attachment state of the card-type recording medium if a command for selecting the card-type recording medium is inputted from the input device.

5. The information reproduction apparatus according to claim 1, wherein the control device places the attachment/reproduction device in a reproduction standby state if the insertion detection device detects the insertion state of the card-type recording medium.

6. The information reproduction apparatus according to claim 1, further comprising an input device for inputting a command from a user, wherein the control device places the attachment/reproduction device in the reproduction standby state if the insertion detection device detects the insertion state of the card-type recording medium and a command for selecting the card-type recording medium is inputted from the input device.

7. The information reproduction apparatus according to claim 1, wherein the control device determines the improper attachment state of the card-type recording medium based on the state detected by the connection detection device and the state detected by the insertion detection device after a predetermined period of time has elapsed from the detection of the insertion state of the card-type recording medium by the insertion detection device.

8. The information reproduction apparatus according to claim 1, further comprising at least one other insertion detection device so that the information reproduction apparatus comprises a plurality of insertion detection devices and the control device determines the improper attachment state of the card-type recording medium based on the states detected by the plurality of insertion detection devices and the state detected by the connection detection device.

9. The information reproduction apparatus according to claim 8, wherein the control device determines the improper attachment state of the card-type recording medium based on the timing of detections by the plurality of insertion detection devices.

10. The information reproduction apparatus according to claim 1, wherein the improper attachment states determined by the control device include at least, an incomplete attachment state, a halfway attachment state, a facedown attachment state, and an inverse direction attachment state.

11. An information reproduction apparatus for reproducing information recorded on a card-type recording medium, comprising:
 a reproduction device for reproducing the information recorded on the card-type recording medium;
 a connection detection device for detecting a connection state of the card-type recording medium to the reproduction device;
 one or more insertion detection devices for detecting an insertion state of the card-type recording medium into the reproduction device; and
 a control device for determining any one of a plurality of different improper attachment states of the card-type recording medium based on the states detected by the connection detection device and the one or more insertion detection devices.

12. The information reproduction apparatus according to claim 11, wherein the one or more insertion detection devices each detects an insertion of the card-type recording medium in response to an actuation thereof by the body of the card-type recording medium.

13. The information reproducing apparatus according to claim 11, wherein the one or more insertion detection devices comprise respective switches.

14. The information reproducing apparatus according to claim 13, wherein the control device determines the improper attachment state of the card-type recording medium based at least in part on the relative timing of detections by the respective switches.

15. The information reproducing apparatus according to claim 11, wherein the one or more insertion detection devices comprise a plurality of respective switches, a first and a second of which are disposed on opposite sides of an opening of the reproduction device into which the card-type recording medium is inserted.

16. The information reproducing apparatus according to claim 15, wherein the control device determines an incomplete attachment state if the connection detection device detects no electrical connection and the first and second insertion detection devices each detects an insertion.

17. The information reproducing apparatus according to claim 15, wherein the control device determines a halfway attachment state of a card-type recording medium configured with a notch at a forward insertion portion thereof if the connection detection device detects no electrical connection, one of the first and second insertion detection devices detects an insertion, and the other of the first and second insertion detection devices detects no insertion.

18. The information reproducing apparatus according to claim 17, wherein the control device determines a face-up or face-down halfway attachment state based on which of the first and second insertion detection devices detects insertion.

19. The information reproducing apparatus according to claim 15, wherein the control device determines an inverse halfway attachment state of a card-type recording medium configured with a notch at a forward insertion portion thereof if the connection detection device detects no electrical connection and the first and second insertion detection devices each detects an insertion.

20. An information reproduction apparatus for reproducing information recorded on a card-type recording medium, comprising:
 a reproduction device for reproducing the information recorded on the card-type recording medium;
 a connection detection device for detecting a connection state of the card-type recording medium to the reproduction device;
 one or more insertion detection devices for detecting an insertion state of the card-type recording medium into the reproduction device; and
 a control device,
 wherein the connection detection device and the one or more insertion detection devices are arranged so that a plurality of different improper attachment states of the card-type recording medium are identifiable, and
 wherein the control device identifies a particular one of the different improper attachment states based on the respective states detected by the connection detection device and the one or more insertion detection devices.

* * * * *